Patented June 17, 1952

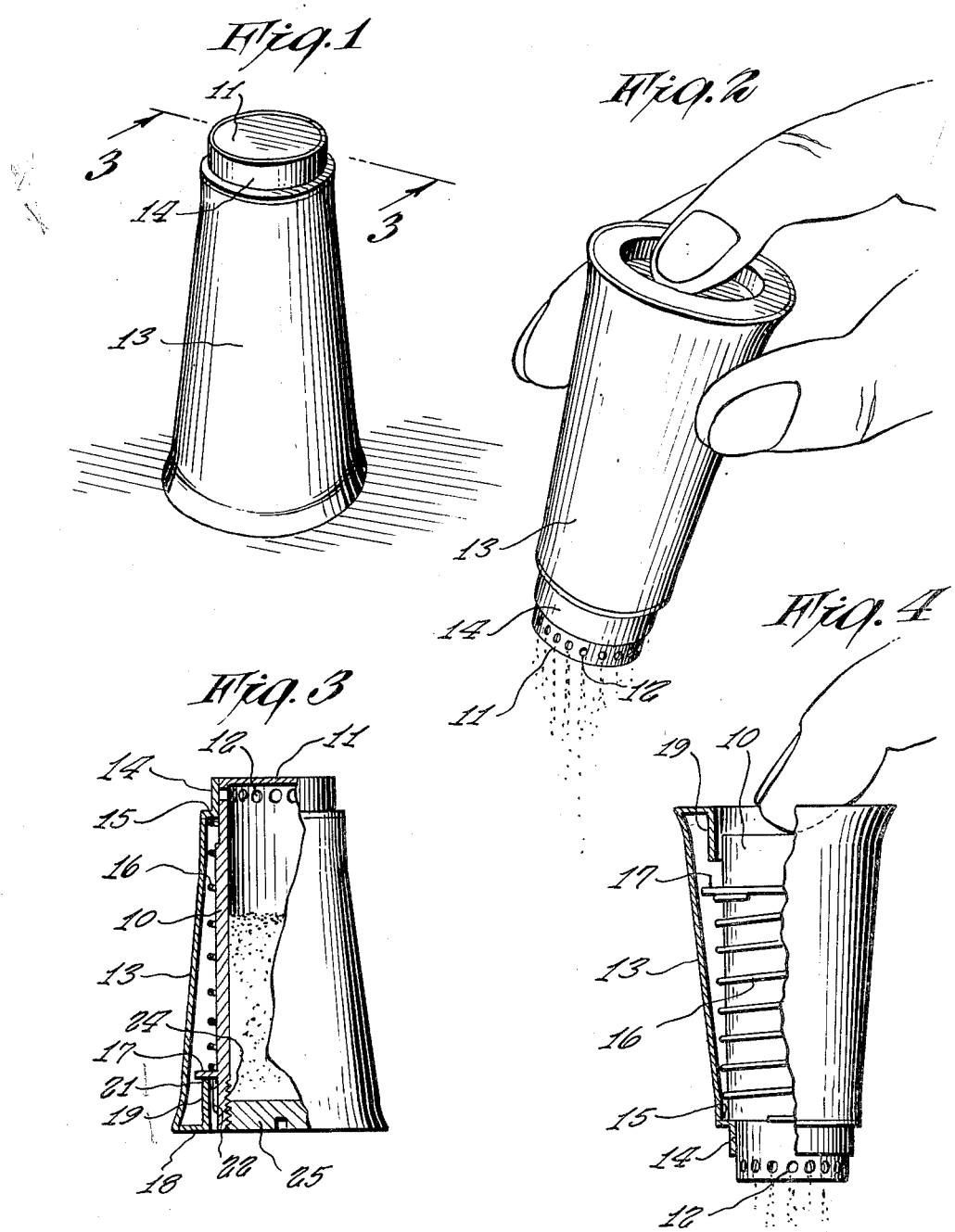

2,601,061

UNITED STATES PATENT OFFICE 2,601,061

SALT SHAKER COMPRISING A CENTRAL CONTAINER SLIDABLE IN OUTER CASING TO UNCOVER OPENINGS

William Schwartz, New York, N. Y.

Application December 18, 1950, Serial No. 201,380

2 Claims. (Cl. 222—162)

This invention relates to salt shakers.

It is an object of the present invention to provide a salt shaker wherein upon putting the salt shaker to use a portion of the shaker containing the salt is pressed outwardly from the surrounding casing to free the openings and permit the dispensing of the salt and whereby upon release of the salt container the same will be retracted under the action of a spring to close off the salt container openings.

A further object of my invention is to provide a salt shaker which will not accidentally spill, is dust and dirt-proof, and also to a certain degree, is moisture-proof.

Other objects of the present invention are to provide a salt shaker of the type above set forth which is of simple construction, inexpensive to manufacture, has a minimum number of parts, compact, easy to assemble and to operate, easy to refill, sanitary, compact, durable, and efficient in operation.

For other objects and for a better understanding of the invention, reference may be had to the following detailed description taken in connection with the accompanying drawing, in which Fig. 1 is a perspective view of the salt shaker embodying the features of the present invention.

Fig. 2 is a perspective view of the salt shaker inverted and with the salt container portion depressed to free the openings for the dispensing of salt.

Fig. 3 is a vertical sectional view taken generally on line 3—3 of Fig. 1.

Fig. 4 is a vertical fragmentary and sectional view of the salt shaker in its inverted position and with the salt container depressed to free the openings.

Referring now to the figures, 10 represents an inner salt container closed at its top, as indicated at 11, and having a plurality of circumferentially spaced holes 12 adjacent to its top end through which salt will be dispensed when this container part is adjusted to free the holes from an outer supporting casing 13.

The outer casing has a reduced head portion 14 which serves as a slide cover over the holes 12. This reduced portion 14 provides a shoulder 15 against which a spring 16 surrounding the container 10 and lying within the casing 13 reacts. The container 10 has, near its lower end, a radially extending flange 17 receiving the spring 16 and urging the container downwardly. The lower part of the outer casing 13 is formed to extend radially inwardly at 18 and upwardly to provide a vertically extending sleeve portion 19 against which the flange 17 of the container 10 may abut to hold the container 10 in its retracted position.

In order to prevent the container part 10 from returning relative to the inner casing, there is provided a radially inwardly extending boss 21 on the upper end of the sleeve projection 19 and a spline projection on the lower end of the container. The lower end of the container 10 is internally threaded, as indicated at 24, and a filling plug 25 may be threaded thereinto. This filling plug, upon being removed, permits the container to be filled with salt.

In operation, the salt shaker is inverted in the manner shown in Figs. 2 and 4, and the plug end of the container 10 is depressed against the action of the spring 16 so that the holes 12 of the container will be exposed and permit the salt to be dispensed.

While various changes may be made in the detail construction, it shall be understood that such changes shall be within the spirit and scope of the present invention as defined by the appended claims.

Having thus set forth and disclosed the nature of my invention, what is claimed is:

1. A shaker construction comprising a central container closed at its upper end and having immediately beneath the closed end a plurality of circumferentially spaced holes through which the material can be dispensed, said central container having a radially extending flange adjacent to its lower end, means removable on the lower end of the container to permit the filling of the container with the material, an outer casing having a shoulder adjacent its upper end and a portion slidable over the openings thereof, said outer casing having an inwardly bent flange engageable with the radially extending flange of the central container and to stop the downward displacement of the central container and a compression spring reacting between the flange of the central container and the shoulder of the outer casing, said central container being adapted to be depressed to free the openings from the portions of the outer casing to dispense the contents of the inner container.

2. A shaker construction comprising a central container closed at its upper end and having immediately beneath the closed end a plurality of circumferentially spaced holes through which the material can be dispensed, said central container having a radially extending flange adjacent to its lower end, means removable on the lower end of the container to permit the filling of the container with the material, an outer casing having a shoulder adjacent its upper end and a portion slidable over the openings thereof, said outer casing having an inwardly bent flange engageable with the radially extending flange of the central container and to stop the downward displacement of the central container and a compression spring reacting between the flange of the central container and the shoulder of the outer casing, said central container being adapted to be depressed to free the openings from the portions of the outer casing to dispense the contents of the inner container, said inwardly bent flange of the outer casing having stop projections thereon and extending inwardly therefrom, said outer container having a radially outwardly extending projection engageable with the stop projections on the flange of the outer casing whereby to prevent relative rotation of the container relative to the outer casing.

WILLIAM SCHWARTZ.

REFERENCES CITED

The following references are of record in the file of this patent:

UNITED STATES PATENTS

| Number | Name | Date |
|--------|------|------|
| 19,182 | Brown | Jan. 26, 1858 |